(12) United States Patent
Zucal et al.

(10) Patent No.: US 7,850,197 B2
(45) Date of Patent: Dec. 14, 2010

(54) TRIM PANEL BREAKAWAY FEATURE

(75) Inventors: James Zucal, Novi, MI (US); Jeremy Thurston, Commerce Township, MI (US); Thomas Yang, Novi, MI (US); Lauren Parkins, Novi, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 440 days.

(21) Appl. No.: 11/869,497

(22) Filed: Oct. 9, 2007

(65) Prior Publication Data

US 2009/0091103 A1    Apr. 9, 2009

(51) Int. Cl.
*B60R 21/21* (2006.01)
*B60R 21/215* (2006.01)

(52) U.S. Cl. ........... 280/728.3; 280/730.2; 296/1.02

(58) Field of Classification Search .......... 280/730.2, 280/728.3; 296/1.02, 1.08, 193.06, 39.1
See application file for complete search history.

(56) References Cited

U.S. PATENT DOCUMENTS

| | | | |
|---|---|---|---|
| 2005/0028323 A1 | 2/2005 | Meyer et al. | |
| 2005/0046160 A1 * | 3/2005 | Totani et al. | 280/730.2 |
| 2006/0220357 A1 | 10/2006 | Lizak | |
| 2007/0080524 A1 * | 4/2007 | Kim | 280/730.2 |
| 2007/0132212 A1 * | 6/2007 | Davey et al. | 280/728.3 |
| 2007/0176399 A1 | 8/2007 | Kullack | |
| 2007/0228702 A1 * | 10/2007 | Ono et al. | 280/730.2 |
| 2008/0001384 A1 * | 1/2008 | Catron et al. | 280/730.2 |

* cited by examiner

*Primary Examiner*—Paul N Dickson
*Assistant Examiner*—Timothy D Wilhelm
(74) *Attorney, Agent, or Firm*—Global IP Counselors, LLP

(57) ABSTRACT

A vehicle body structure includes a pillar, a trim panel, a handle and an airbag. The trim panel is configured to overlay a portion of the pillar and conceal the airbag. The trim panel includes a first trim portion and a second trim portion that is separable from the first trim portion along a predetermined separation line. The handle is rigidly attached to the pillar by at least one fastener that extends through the second trim portion of the trim panel. The airbag is disposed between the trim panel and the pillar such that in response to deployment of the airbag at least a portion of the first trim portion separates from the second trim portion along the predetermined separation line.

18 Claims, 8 Drawing Sheets

TRIM PANEL BREAKAWAY FEATURE

BACKGROUND OF THE INVENTION

1. Field of the Invention

The present invention relates to vehicle body structure that includes a trim panel breakaway feature. More specifically, the present invention relates to vehicle body structure that includes a pillar with a trim panel that at least partially breaks away from the pillar allowing deployment of an airbag concealed behind the trim panel.

2. Background Information

Vehicle structures are continually being improved for passenger safety. One recent modification to vehicles is the inclusion of airbags. Typically, an airbag includes inflatable member that when deployed creates a cushioning bag or cushioning curtain to protect a passenger or passengers during impact events. Airbags are becoming more prevalent in passenger vehicles such as sedans, coupes, SUVs (sports utility vehicles) and trucks.

Newly proposed safety regulations mandate the inclusion of airbags on pillar structures within certain vehicles, such as SUVs and trucks. The proposed safety regulations would require that an A-pillar include an airbag that inflates to form a cushioning curtain between the vehicle passenger and either or both of a door and interior roof of the vehicle.

Most SUVs, trucks and vans include an assist grip handle mounted on the A-pillar adjacent to the front door of the vehicle. The assist grip handle is a handle mounted proximate a door opening that can be used by a passenger to assist in entering and exiting the vehicle. Pillars with such assist grip handles include the A-pillar located between one side of the windshield and the vehicle front door and the B-pillar located between front and rear side doors of the vehicle. Typically, metal structural elements of the A-pillar and B-pillar are covered with a trim panel to provide an attractive appearance. Typically, the handle is mounted to the pillar with fasteners that extend through apertures in the trim panels.

The newly proposed safety regulations requiring an airbag on the A-pillar create a problem. Ideally, the trim panel should conceal the airbag, but somehow allow the airbag to inflate upon deployment. The problem is that the handle mounted to the pillar prevents the trim panel from moving in response to airbag deployment.

In view of the above, it will be apparent to those skilled in the art from this disclosure that there exists a need for an improved pillar and trim panel design that allows for the inclusion of both a handle and a concealed airbag. This invention addresses this need in the art as well as other needs, which will become apparent to those skilled in the art from this disclosure.

SUMMARY OF THE INVENTION

One object of the present invention is to meet new safety regulations regarding inclusion of an airbag that must deploy in the region of the A-pillar of a vehicle in response to an impact event.

Another object of the present invention is to provide a trim panel configuration that allows an airbag to deploy and inflate without interference by an assist grip handle.

In accordance with the present invention, a vehicle body structure includes a pillar, a trim panel, a handle and an airbag. The trim panel overlays a portion of the pillar and conceals the airbag. The trim panel includes a first trim portion and a second trim portion that is separable from the first trim portion along a predetermined separation line. The handle is rigidly attached to the pillar by at least one fastener that extends through the second trim portion of the trim panel. The airbag is disposed between the trim panel and the pillar such that in response to deployment of the airbag at least a portion of the first trim portion separates from the second trim portion along the predetermined separation line.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
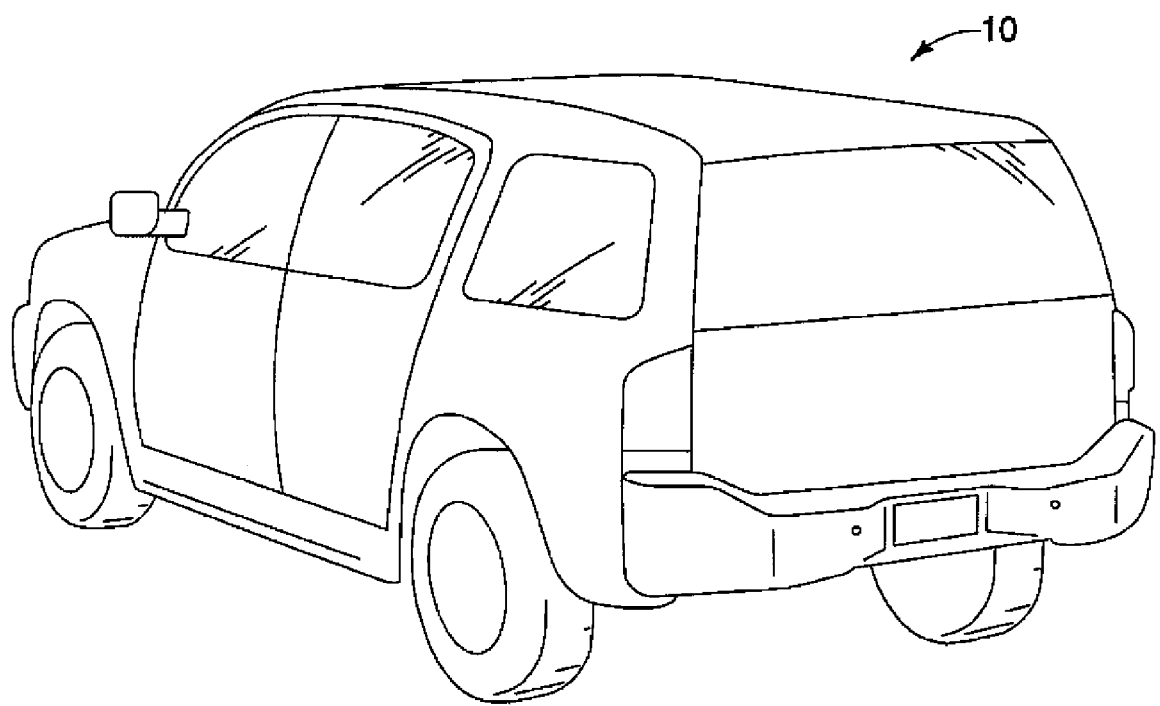
FIG. 1 is a perspective view of a vehicle in accordance with the present invention.
Figure 2:
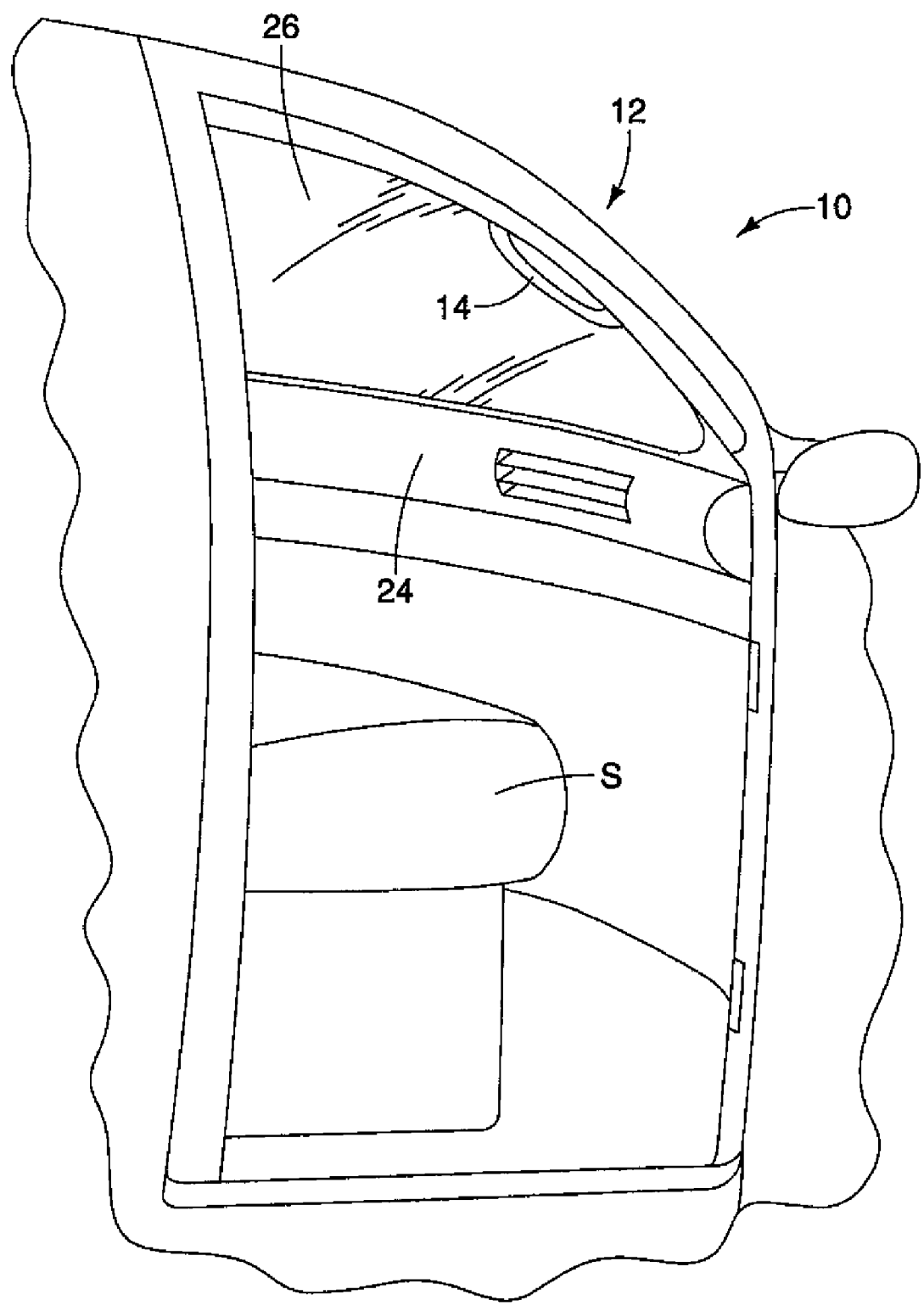
FIG. 2 is a perspective view of a portion of the vehicle with a front door removed to show a A-pillar with a handle in accordance with the present invention.
Figure 3:
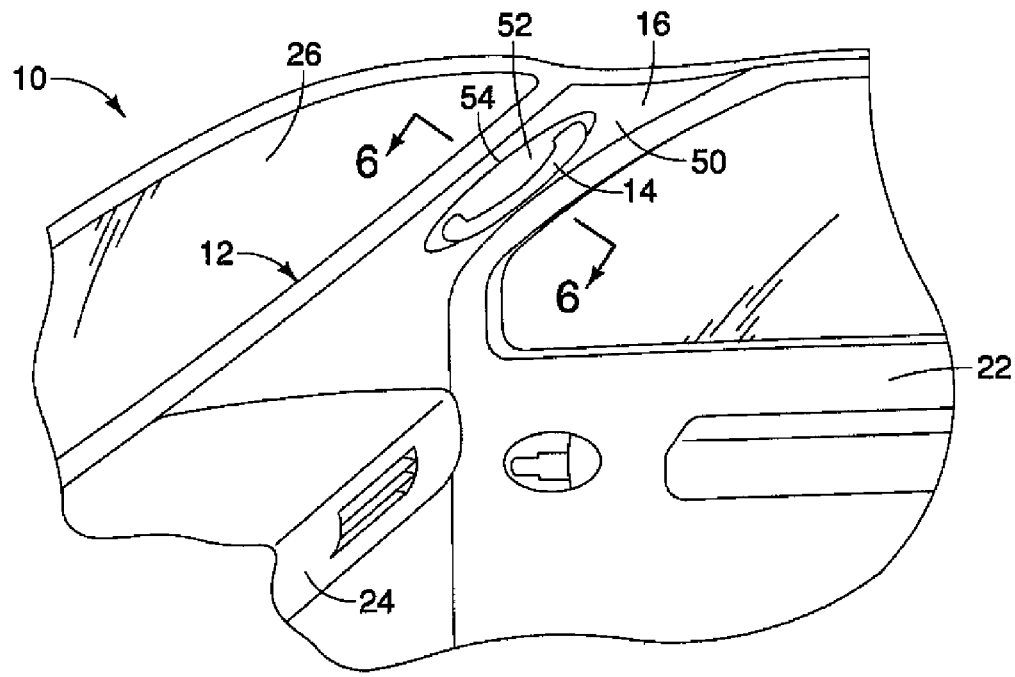
FIG. 3 is a fragmentary side view of an interior of the vehicle showing the door, the A-pillar, the handle and a trim panel that includes first and second portions, the first portion of the trim panel being confined between the handle and the A-pillar in accordance with a first embodiment of the present invention.
Figure 4:
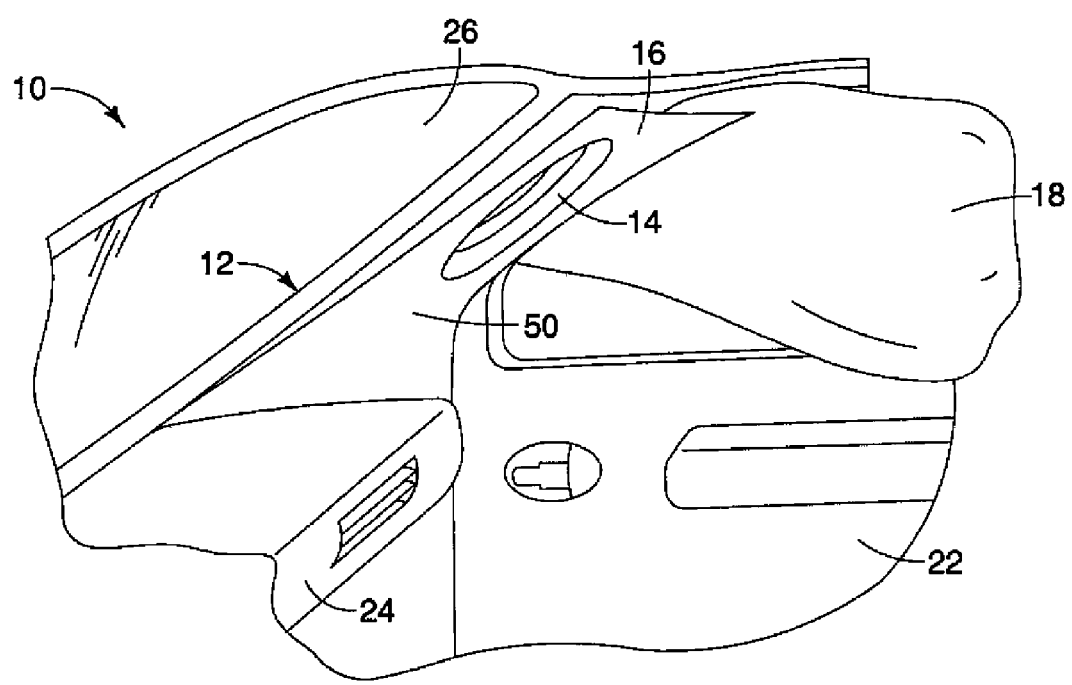
FIG. 4 is another fragmentary side view of the interior of the vehicle similar to FIG. 3, showing a deployed airbag that is partially concealed behind the second portion of the trim panel, the second portion of the trim panel being separated from the first portion of the trim panel by the deployment of the airbag in accordance with the first embodiment of the present invention.

Referring initially to FIG. 1, a vehicle 10 is illustrated in accordance with a first embodiment of the present invention. As shown in FIG. 2, the vehicle 10 includes a pillar 12 with a handle 14 installed on the pillar 12. The handle 14 provides an assist grip that helps passengers get in and out of the vehicle 10. As shown in FIGS. 3 and 4, the pillar 12 is an A-pillar of the vehicle 10 that is provided with a breakaway feature that allows a trim panel 16 to move away from the pillar 12 in response to deployment of a concealed airbag 18, as described in greater detail below.

Figure 5:
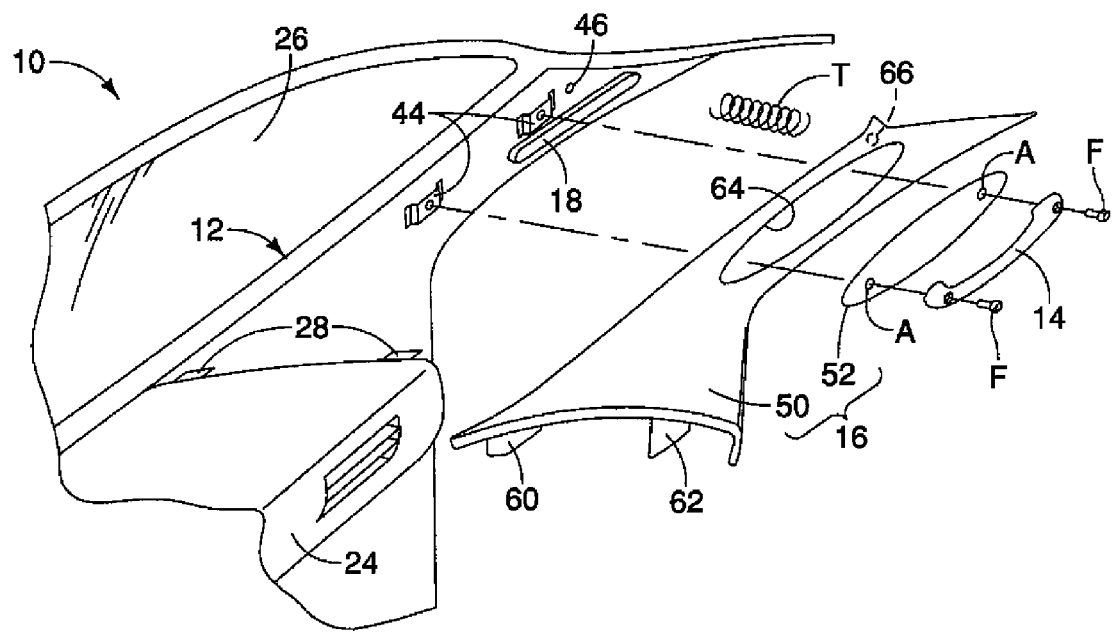
FIG. 5 is an exploded fragmentary side view of the interior of the vehicle similar to FIG. 3, showing the first and second portions of the trim panel, with the airbag mounted to the A-pillar in an undeployed condition in accordance with the first embodiment of the present invention.

The vehicle 10 is depicted as an SUV, but can alternatively be a truck, a van, passenger vehicle such as a sedan or coupe or any vehicle that benefits from the inclusion of the handle 14 installed on the pillar 12 within the vehicle passenger compartment. As shown in FIGS. 2, 3 and 4, the vehicle 10 includes various conventional elements, such as, for example, a door 22 (FIGS. 3 and 4 the door 22 has been removed in FIG. 2 to provide greater clarity), a dashboard 24, a windshield 26 and seats S (shown in FIG. 2 only). As shown in FIG. 5, the dashboard 24 is a conventional vehicle component that includes a pair of recesses 28 whose function is described in greater detail below. The vehicle 10 also includes the pillar 12, described in greater detail below.

In the drawings, the pillar 12 is depicted as an A-pillar of the vehicle 10. Typically, A-pillars are structural portions of a vehicle located between the windshield 26 and the door 22 (for example, front doors—passenger and drivers doors). However, it should be understood from the drawings and the description herein that the present invention can be utilized in the instance where the pillar 12 as an A-pillar, a B-pillar or other pillars within the vehicle adjacent to a door where the handle 14 provides passenger benefits.

Figure 6:
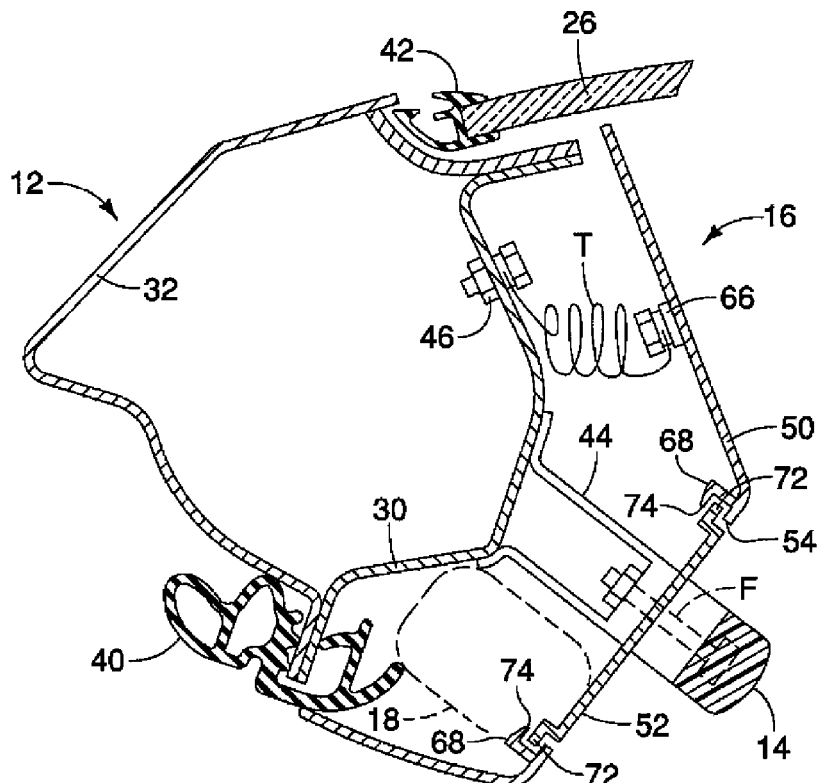
FIG. 6 is a cross-sectional view of the A-pillar taken along the lines 6-6 in FIG. 3, showing the various elements of the A-pillar, the first and second portions of the trim panel, the handle, the airbag and a tether that restricts movement of the second portion of the trim panel when the airbag deploys in accordance with the first embodiment of the present invention.

As best shown in FIG. 6, the pillar 12 basically includes an inner pillar portion 30, an outer pillar portion 32, the airbag 18 and the trim panel 16. Preferably, the inner and outer pillar portion 30 and 32 are welded or otherwise rigidly fixed to one another to form a structural portion of the pillar 12 that, for example, supports the roof of the vehicle 10. A door sealing member 40 is preferably installed along one side of the pillar 12 and a windshield sealing member 42 is preferably installed along another side of the pillar 12, as shown in FIG. 6. The inner pillar portion 30 also includes a pair of attachment members 44 and a tether attachment portion 46, as shown in FIGS. 5 and 6.

The airbag 18 is attached to an upper region of the inner pillar portion 30 by conventional fasteners (not shown). The airbag 18 is a preferably a safety device that is operably connected in a conventional manner to sensors and/or a control device (not shown) that activates the airbag 18 in response to an impact or collision in a conventional manner. Preferably, the airbag 18 is an air curtain-type device dimensioned such that when deployed in response to vehicle impact, the airbag 18 inflates to a shape similar to an inflatable mattress or the like. As indicated in FIG. 4, once deployed, the airbag 18 takes on a rectangular like-shape forming a protective cushion between a passenger and the door 22. It should be understood from the drawings and the description herein that the airbag 18 can also be configured to form a protective cushion between the passenger and the inner part of the roof of the vehicle 10. In other words, the specific dimensions and inflated characteristics of the airbag 18 are not limited to those depicted in FIG. 4, but can be specifically chosen depending upon the dimensions and characteristics of the vehicle 10 and requirements of current and proposed safety standards.

The trim panel 16 is configured to overlay a portion of the pillar 12 and conceal the airbag 18. The trim panel 16 is also configured to at least partially breakaway from the pillar 12 in response to deployment (inflation) of the airbag 18. The trim panel 16 is also configured to move away from the pillar 12 a sufficient distance away from the pillar 12 to allow full deployment of the airbag 18. However, the trim panel 16 is also configured to move away from the pillar 12 by no more than a predetermined distance.

As shown in FIGS. 3-6, the trim panel 16 basically includes a first trim portion 50 and a second trim portion 52. A predetermined separation line 54 is defined between the first trim portion 50 and the second trim portion 52 as indicated in FIGS. 3 and 6. The second trim portion 52 is separable from the first trim portion 50 along the separation line 54.

In the first embodiment of the present invention, the predetermined separation line 54 of the trim panel 16 is configured such that the first trim portion 50 completely separates from the second trim portion 52 in response to deployment of the airbag 18. However, as shown in FIG. 3, with the airbag 18 in an undeployed condition, the first trim portion 50 of the trim panel 16 completely conceals the airbag 18.

As shown in FIGS. 5 and 6, the first trim portion 50 includes lower end projections 60 and 62, an oval aperture 64, a tether retaining portion 66 and a fastener structure 68 (FIG. 6 only).

The lower end projections 60 and 62 are configured and dimensioned to fit into respective ones of the pair of recesses 28 in the dashboard 24, as indicated in FIG. 5. The oval aperture 64 is dimensioned to receive the second trim portion 52 of the trim panel 16, as described further below. One end of a tether T is connected to the tether retaining portion 46 of the inner pillar portion 30 of the pillar 12 and the other end of the tether T is connected to the tether retaining portion 66 of the first trim portion 50.

The fastener structure 68 is configured to retain the first and second trim portions 50 and 52 together prior to deployment of the airbag 18. The fastener structure 68 is described below along with a description of the second trim portion 52.

The second trim portion 52 is an oval shaped member dimensioned to correspond to the oval aperture 64 in the first trim portion 50. The second trim portion 52 is disposed between the inner pillar portion 30 of the pillar 12 and ends of the handle 14.

The fastener structure 68 of the trim panel 16 includes a protruding lip 72 formed on one of the first and second trim portions 50 and 52 and a recessed portion 74 formed on the other of the first and second trim portions 50 and 62 to receive the protruding lip 72. In the depicted embodiment, the protruding lip 72 is formed on the second trim portion 52 and the recessed portion 74 is formed on the first trim portion 50. It should be understood from the drawings and the description herein that the fastener structure 68 can alternatively be configured with the protruding lip 72 formed on the first trim portion 50 and the recessed portion 74 formed on the second trim portion 52.

The handle 14 is installed to the pillar 12 by fastening elements F. The fastening elements F extend from respective ends of the handle 14 through apertures A in the second trim portion 52 and into respective ones of the attachment members 44, as indicated in FIGS. 5 and 6. Hence, the second trim portions 52 are fixed to the pillar 12 by the fastening elements F of the handle 14.

The first and second trim portions 50 and 52 of the trim panel 16 are preferably configured such that the separation line 54 allows for rapid separation of the first trim portion 50 from the second trim portion 52 in response to deployment of the airbag 18. As shown in FIG. 4, during deployment of the airbag 18, the first trim portion 50 completely separates from the second trim portion 52, the pillar 12 and the handle 14. However, the lower end projections 60 and 62 remains in the recesses 28 of the dashboard 26. The tether T limits movement of the upper end of the first trim portion 50 and the lower end projections 60 and 62 limit movement of the lower end of the first trim portion 50. The tether T is dimensioned to allow movement of the upper end of the first trim portion 50 an amount sufficient to allow complete inflation and expansion of the airbag 18 away from the pillar 12 upon deployment but limits movement to prevent the first trim portion 50 from completely disassociating itself from the dashboard 24.

Hence, the airbag 18 is disposed between the trim panel 16 and the pillar 12 such that in response to deployment of the airbag 18 at least a portion of the first trim portion 50 separates from the second trim portion 52 along the predetermined separation line 54. The airbag 18 can completely inflate upon deployment in response to an impact event without interference from the trim panel 16.

Second Embodiment

Figure 7:
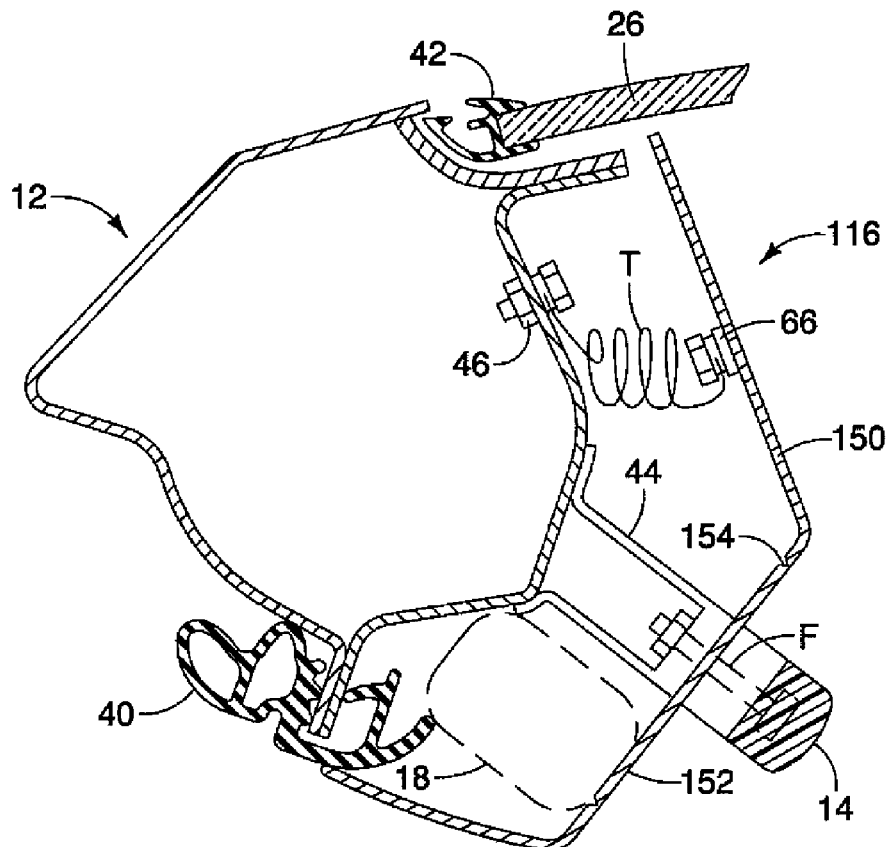
FIG. 7 is a cross-sectional view of the A-pillar similar to FIG. 6, showing the various elements of the A-pillar, a first and second portions of a trim panel, the handle, the airbag and the tether in accordance with a second embodiment of the present invention.
Figure 8:
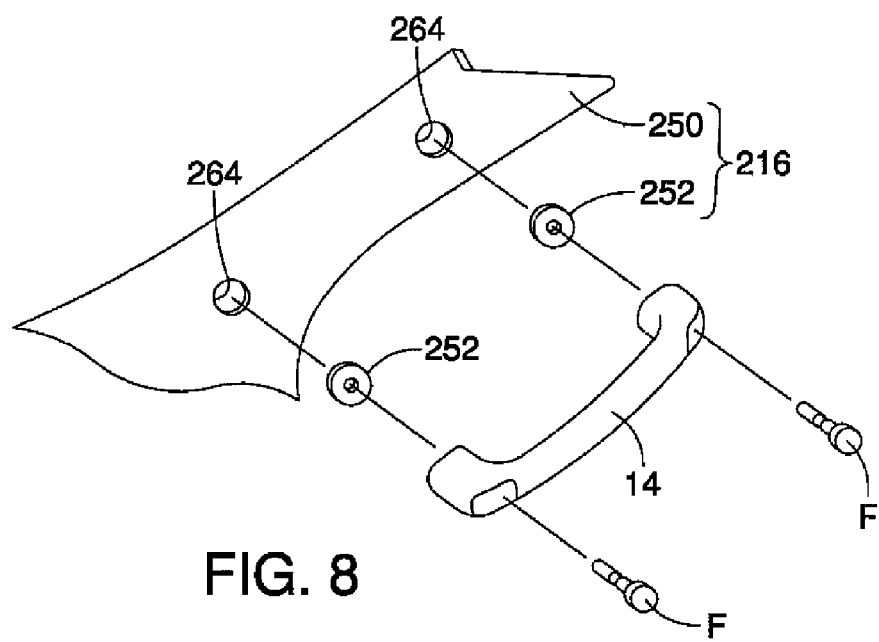
FIG. 8 is an exploded view of a trim panel and a handle showing first and second portions of the trim panel in accordance with a third embodiment of the present invention.
Figure 9:
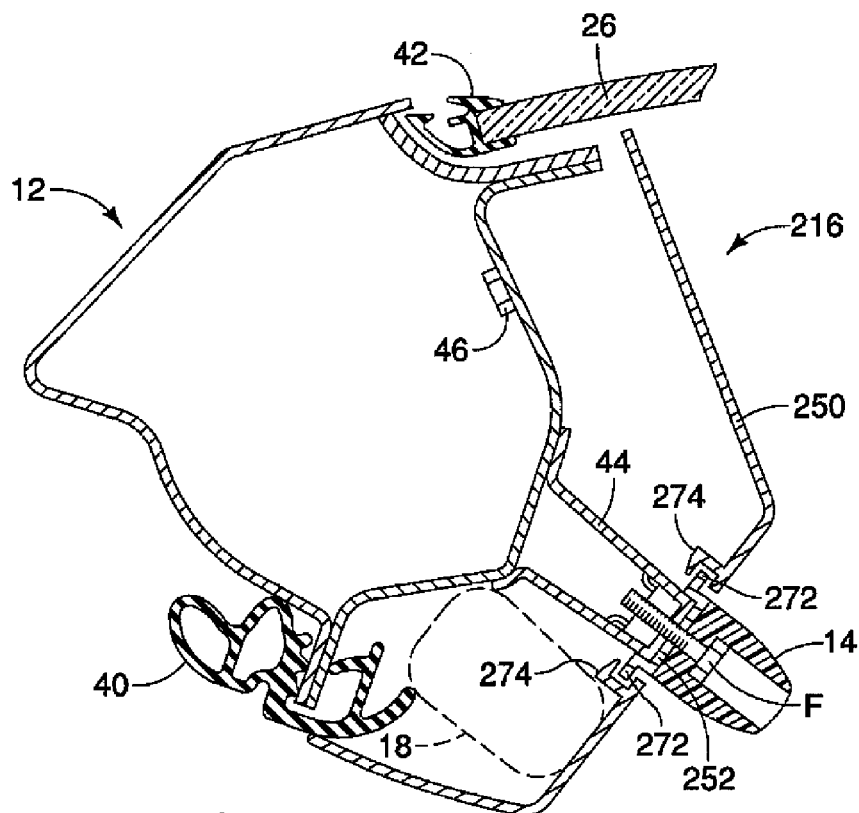
FIG. 9 is a cross-sectional view of the A-pillar depicted in FIG. 8, showing the various elements of the A-pillar, the first and second portions of the trim panel, the handle and the airbag in accordance with the third embodiment of the present invention.

Referring now to FIG. 7, a trim panel 116 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the trim panel 116 replaces the trim panel 16 of the first embodiment. The pillar 12 is the same as in the first embodiment and includes the door sealing member 40, the windshield sealing member 42, the pair of attachment members 44 and the tether attachment portion 46. The handle 14 and the airbag 18 are also the same as in the first embodiment.

The trim panel 116 includes a first trim portion 150 and a second trim portion 152 that are delineated by a separation line 154. The first trim portion 150 includes the tether retaining portion 66 of the first trim portion 50 of the first embodiment. The fastener structure 68 of the first embodiment is replaced in the second embodiment by a line of weakening formed along the separation line 154. The tether T is attached to the tether attachment portion 46 of the pillar 12 and the tether attachment portion 66 of the first trim portion 150.

However, in the second embodiment, the trim panel 116 is a single unitary body. More specifically, the first and second trim portions 150 and 152 are formed as a single integral unitary element with the line of weakening formed therebetween. The line of weakening defines the line of separation 154 and is preferably a thinned portion of the trim panel 116 that can be hidden from view or can appear to be a decorative feature of the trim panel 116. Upon deployment of the airbag 18, the first trim portion 150 separates from the second trim portion 152 at the separation line 154. More specifically, the line of weakening is dimensioned such that the first trim portion 150 easily tears or breaks away from the second trim portion 152 upon deployment of the airbag 18. The line of weakening (the line of separation 154) is preferably oval shaped similar to the oval aperture 64 of the first trim portion 50 of the first embodiment, but can alternatively have any of a variety of shapes. Regardless of the shape of the line of separation 154, the first trim portion 150 can undergo only a limited amount of movement away from the pillar 12 because of the tether T.

Third Embodiment

Referring now to FIGS. 8, 9, 11 and 12, a trim panel 216 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the trim panel 216 replaces the trim panel 16 of the first embodiment. The pillar 12 is the same as in the first embodiment and includes the door sealing member 40, the windshield sealing member 42 and the pair of attachment members 44. The handle 14 and the airbag 18 are also the same as in the first embodiment.

In the third embodiment of the present invention, the trim panel 216 includes a first trim portion 250 and a second trim portion 252 that are separated by a separation line. The first trim portion 250 includes two apertures 264 that are spaced apart from one another at distance corresponding to the distance between ends of the handle 14 and the attachment member 44 of the pillar 12. The edges of the two apertures 264 each define a respective ones of lines of separation between the first trim portion 250 and the second trim portions 252. The region between the two apertures 264 of the first trim portion 250 defines a tether portion 290.

The second trim portion 252 is in the form of two round washer shaped members dimensioned to fit within the apertures 264 of the first trim portion 250. Each of the second trim portions 252 has a central aperture that receives the fastening element F. The second trim portions 252 are disposed between respective ends of the handle 14 and respective ones of the attachment members 44 of the pillar 12.

The trim panel 216 includes a fastener structure that is similar to the first embodiment. Specifically, the first trim portion 250 includes recessed portions 274 and the second trim portions 252 define protruding lips 272 that extend into respective ones of the recessed portions 274 (see FIG. 9).

Figure 11:
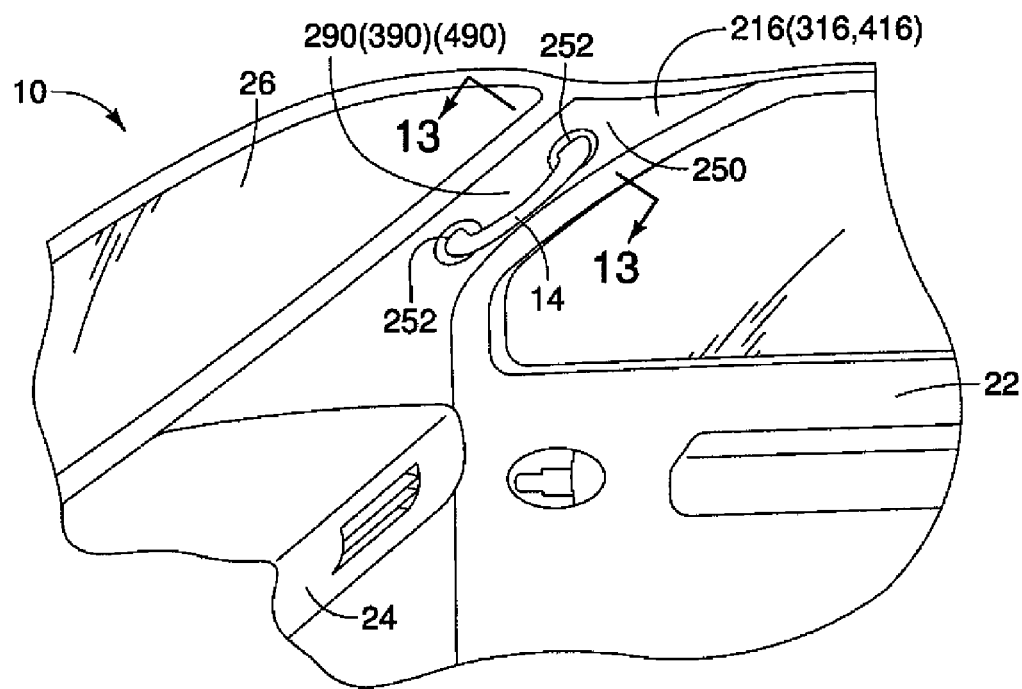
FIG. 11 is a fragmentary side view of an interior of the vehicle similar to FIG. 3, showing the door, the A-pillar, the handle and the trim panel in accordance with the third, fourth and fifth embodiments of the present invention.
Figure 12:
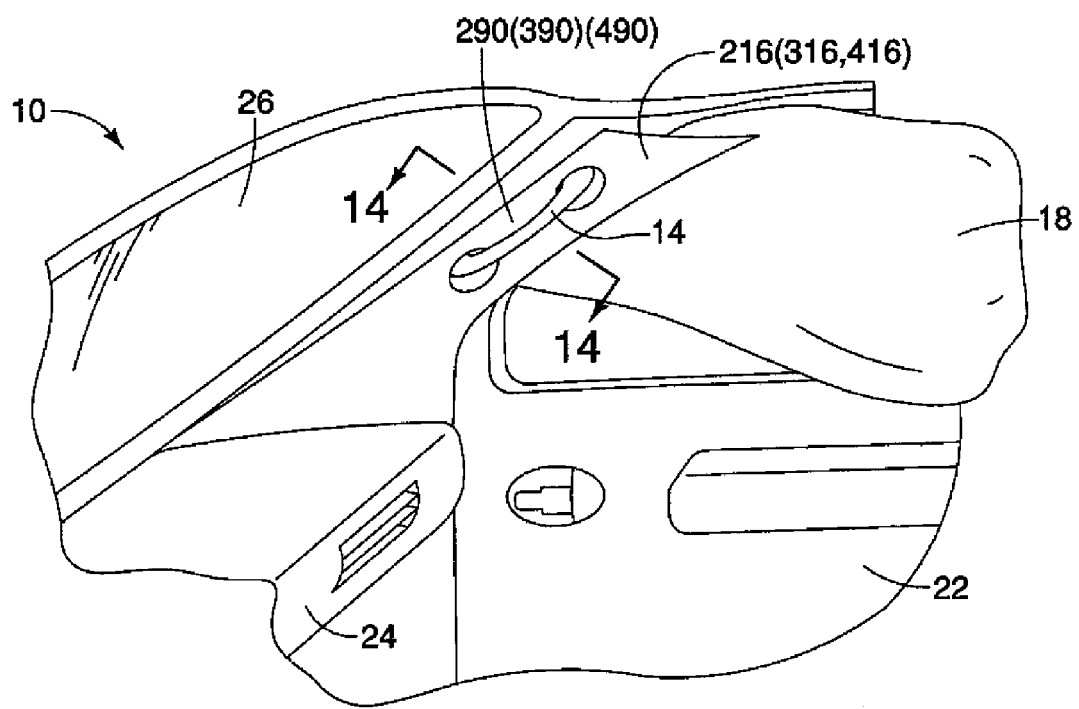
FIG. 12 is a fragmentary side view of the interior of the vehicle similar to FIG. 11, showing a deployed airbag that is partially concealed behind the second portion of the trim panel, the second portion of the trim panel being separated from the first portion of the trim panel by the deployment of the airbag with the handle restricting movement of the second portion of the trim panel in accordance with the third, fourth and fifth embodiments of the present invention.

No tether is necessary in the third embodiment, as shown in FIGS. 11 and 12. Specifically, when the airbag 18 is deployed, the first trim portion 250 breaks away from the second trim portions 252 and the first trim portion 250 moves away from the pillar 12 allowing the airbag 18 to fully inflate. However, the handle 14 extends between the second trim portions 252 and around the tether portion 290 thereby restraining the first trim portion 250 from moving more than a limited distance relative to the pillar 12. Hence, the handle 14 acts as a tether in the third embodiment.

Fourth Embodiment

Figure 10:
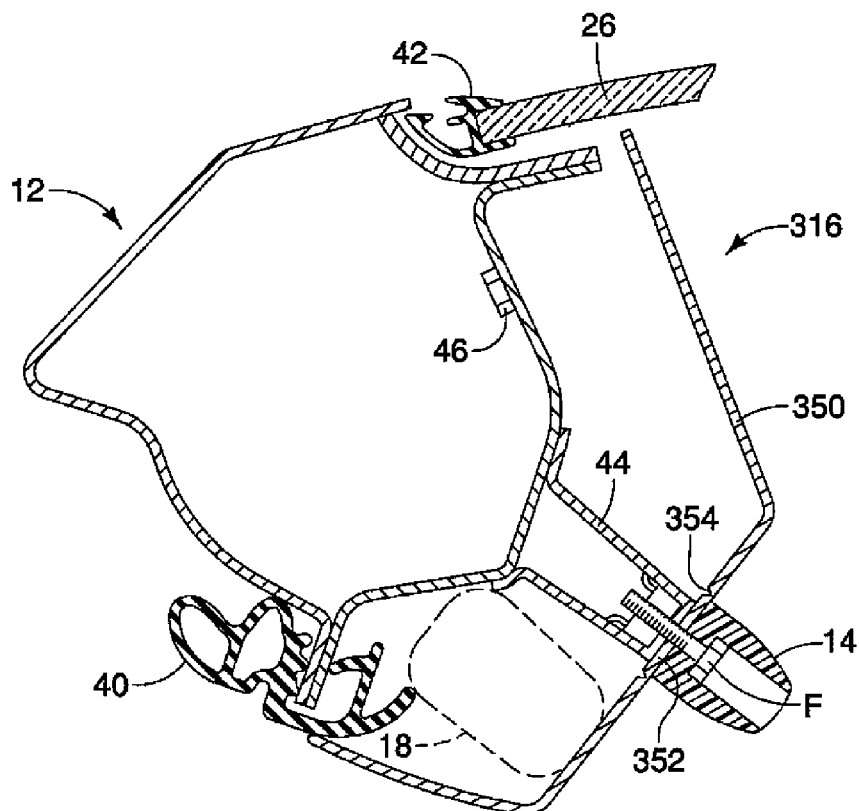
FIG. 10 is a cross-sectional view of a A-pillar similar to FIG. 9, showing the various elements of the A-pillar, first and second portions of a trim panel, the handle and the airbag in accordance with a fourth embodiment of the present invention.

Referring now to FIGS. 10-12, a trim panel 316 in accordance with a fourth embodiment will now be explained. In view of the similarity between the third and fourth embodiments, the parts of the fourth embodiment that are identical to the parts of the third embodiment will be given the same reference numerals as the parts of the third embodiment. Moreover, the descriptions of the parts of the fourth embodiment that are identical to the parts of the third embodiment may be omitted for the sake of brevity.

In the fourth embodiment, the trim panel 316 replaces the trim panel 216 of the third embodiment. The pillar 12 is the same as in the third embodiment and includes the door sealing member 40, the windshield sealing member 42 and the pair of attachment members 44. The handle 14 and the airbag 18 are also the same as in the third embodiment.

In the fourth embodiment of the present invention, the trim panel 316 includes a first trim portion 350 and a second trim portion 352 that are separated by a separation line 354. The second trim portion 352 is in the form of two round washer shaped portions dimensioned similar to the second trim portions 252 of the third embodiment. However, in the fourth embodiment, the line of separation 354 is defined by a line of weakening. Between the lines of separation 354, a tether portion 390 is defined on the first trim portion 350, as indicated in FIGS. 11 and 12.

More specifically, in the fourth embodiment, the trim panel 316 is a single unitary body. The first and second trim portions 350 and 352 are formed as a single integral unitary element with the line of weakening (the separation line 354) formed therebetween. The line of weakening is preferably a thinned portion of the trim panel 316 that can be hidden from view or can appear to be a decorative feature of the trim panel 316. Upon deployment of the airbag 18, the first trim portion 350 separates from the second trim portion 352 at the separation line 354. More specifically, the line of weakening is dimensioned such that the first trim portion 350 cleanly tears away from the second trim portion 352 upon deployment of the airbag 18.

No tether is necessary in the fourth embodiment, as shown in FIGS. 11 and 12. Specifically, when the airbag 18 is deployed, the first trim portion 350 breaks away from the second trim portions 352 and the first trim portion 350 moves away from the pillar 12 allowing the airbag 18 to fully inflate. However, the handle 14 extends between the second trim portions 352 and around the tether portion 390 restraining the first trim portion 350 from moving more than a limited distance relative to the pillar 12. Hence, the handle 14 acts as a tether in the fourth embodiment.

Fifth Embodiment

Figure 13:
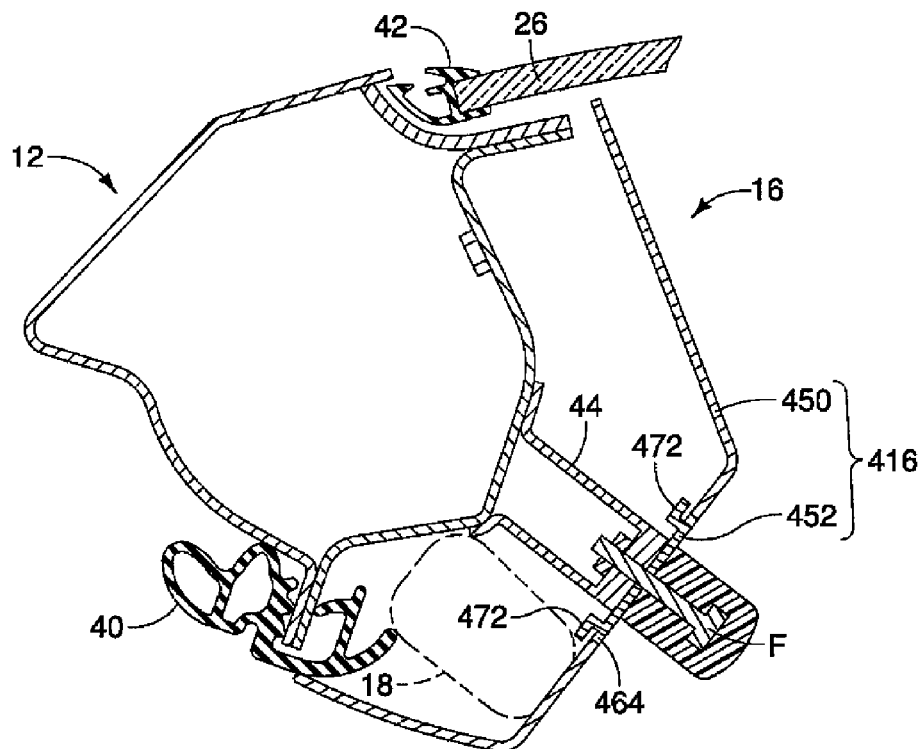
FIG. 13 is a cross-sectional view of the A-pillar taken along the line 13-13 in FIG. 11, showing the various elements of the A-pillar, a first and second portions of a trim panel, the handle and the airbag in an undeployed condition in accordance with a fifth embodiment of the present invention.
Figure 14:
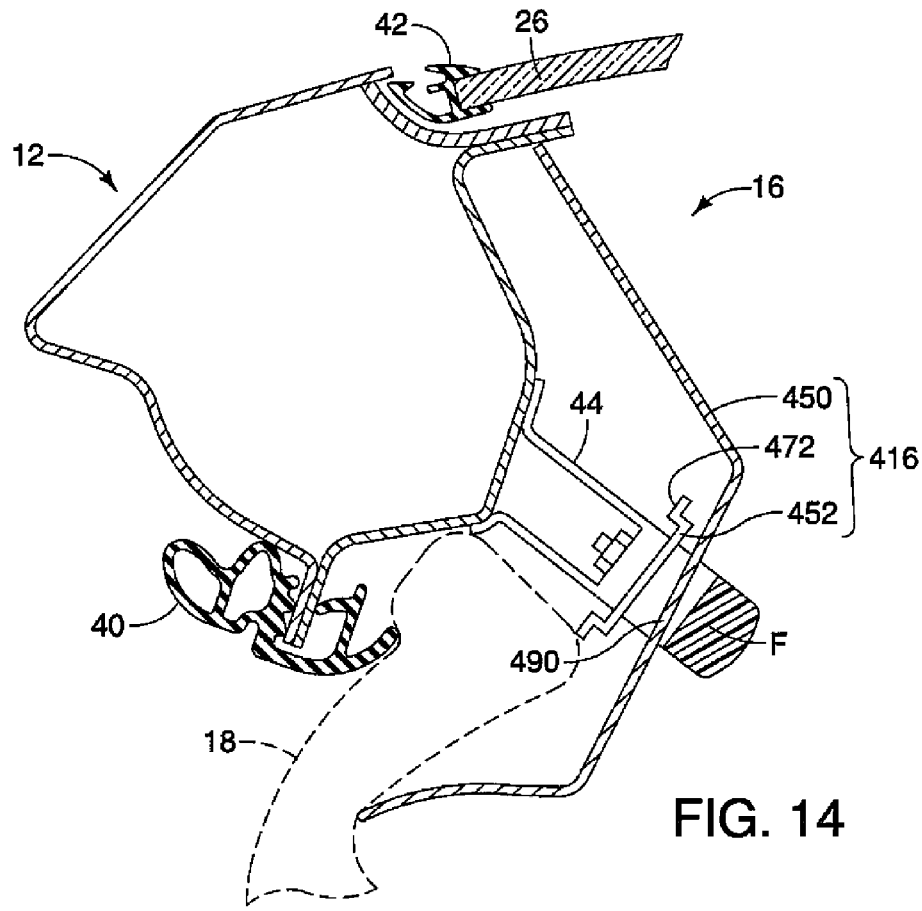
FIG. 14 is a cross-sectional view of the A-pillar taken along the line 14-14 in FIG. 12, showing the various elements of the A-pillar, the first and second portions of a trim panel, the handle and the airbag in a deployed condition in accordance with the fifth embodiment of the present invention.

Referring now to FIGS. 13 and 14, a trim panel 416 in accordance with a fifth embodiment will now be explained. In view of the similarity between the third and fifth embodiments, the parts of the fifth embodiment that are identical to the parts of the third embodiment will be given the same reference numerals as the parts of the third embodiment. Moreover, the descriptions of the parts of the fifth embodiment that are identical to the parts of the third embodiment may be omitted for the sake of brevity.

In the fifth embodiment, the trim panel 416 replaces the trim panel 216 of the third embodiment. The pillar 12 is the same as in the first and third embodiments and includes the door sealing member 40, the windshield sealing member 42 and the pair of attachment members 44. The handle 14 and the airbag 18 are also the same as in the first and third embodiments.

In the fifth embodiment of the present invention, the trim panel 416 includes a first trim portion 450 and a second trim portion 452 that are separated by a separation line. The first trim portion 450 includes two apertures 464 that are spaced apart from one another be a distance corresponding to the distance between ends of the handle 14 and the attachment member 44 of the pillar 12. Between the two apertures 464, a tether portion 490 is defined.

The second trim portion 452 is in the form of two round washer shaped members dimensioned to fit within the apertures 464 of the first trim portion 450. Each of the second trim portions 452 has a central aperture that receives the fastening element F. The second trim portions 452 are disposed between respective ends of the handle 14 and respective ones of the attachment members 44 of the pillar 12.

The separation line of the trim panel 416 is defined by the second trim portions 452 which include protruding lips 472 that extend behind areas around respective ones of the apertures 464 of the first trim portion 450.

No tether is necessary in the third embodiment, as shown in FIGS. 11 and 12. Specifically, when the airbag 18 is deployed, the first trim portion 450 breaks away from the second trim portions 452 and the first trim portion 450 moves away from the pillar 12 allowing the airbag 18 to fully inflate. However, the handle 14 extends between the second trim portions 452 and around the tether portion 490 thereby restraining the first trim portion 450 from moving more than a limited distance relative to the pillar 12. Hence, the handle 14 acts as a tether in the fifth embodiment.

In each of the embodiments above, the first trim portions 50, 150, 250, 350 and 450 can alternatively also include tabs, projections, clips or other such snap-fitting-type attachment structures (not shown) that can retain the first trim portions 50, 150, 250, 350 and 450 to the pillar 12. Such attachment structures are configured to release upon deployment of the airbag 18. However, since such attachment structures are well known and conventional in nature, description of such attachment structures are omitted for the sake of brevity but are within the scope of the present invention in its various embodiments.

The various portions of the vehicle 10, such as interior trim, structural elements, suspension and power train elements are conventional components that are well known in the art. Since vehicles are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
   a pillar;
   a trim panel overlaying a portion of the pillar with the trim panel including a first trim portion and a second trim portion that is separable from the first trim portion along a predetermined separation line, one of the first trim portion and the second trim portion includes a recessed portion that defines a U-shaped channel when viewed in cross-section and the other of the first trim portion and the second trim portion includes a protruding lip that extends into the recessed portion;
   a handle rigidly attached to the pillar by at least one fastener that extends through the second trim portion of the trim panel;
   an airbag disposed between the trim panel and the pillar such that in response to deployment of the airbag at least a portion of the first trim portion separates from the second trim portion along the predetermined separation line; and
   a tether extending between the first trim panel and the pillar restraining the first trim panel to a limited distance of movement relative to the pillar in response to deployment of the airbag.

2. The vehicle body structure according to claim 1, wherein the predetermined separation line of the trim panel is configured such that the first trim portion completely separates from the second trim portion in response to deployment of the airbag.

3. The vehicle body structure according to claim 1, wherein the trim panel includes a fastener structure retaining the first and second trim portions together prior to deployment of the airbag.

4. The vehicle body structure according to claim 1, wherein the first and second trim portions are formed as a single integral unitary element with a line of weakening forming the predetermined separation line.

5. The vehicle body structure according to claim 1, wherein the trim panel includes a protruding lip formed on one of the first and second trim portions and a recessed portion formed on the other of the first and second trim portions to receive the protruding lip.

6. The vehicle body structure according to claim 1, wherein the at least one fastener includes two fastening elements that rigidly attach the handle to the pillar at two separate points.

7. The vehicle body structure according to claim 6, wherein the two separate points are vertically spaced apart from one another, and
   the airbag extends downward along the pillar from an area above the handle to an area adjacent to an upper one of the two separate points such that a lower end of the airbag is located above a lower one of the two separate points.

8. The vehicle body structure according to claim 1, wherein the second trim portion comprises an oval shaped member disposed between the pillar and ends of the handle with the at least one fastening element extending from one end of the handle through the oval shaped member of the second trim portion.

9. The vehicle body structure according to claim 8, wherein the trim panel includes an oval shaped opening configured to receive the second trim portion.

10. The vehicle body structure according to claim 8, wherein the first and second trim portions are formed as a single integral unitary element with a line of weakening forming the predetermined separation line.

11. The vehicle body structure according to claim 8, wherein the trim panel includes a protruding lip formed on one of the first and second trim portions and a recessed portion formed on the other of the first and second trim portions to receive the protruding lip.

12. The vehicle body structure according to claim 1, wherein the airbag extends along the pillar from an area above the handle to an area adjacent to the handle.

13. The vehicle body structure according to claim 1, wherein
the airbag is disposed on a first side of the handle and the tether is disposed on a second side of the handle opposite the first side.

14. A vehicle body structure comprising:
a pillar;
a trim panel overlaying a portion of the pillar with the trim panel including a first trim portion and a second trim portion that is separable from the first trim portion along a predetermined separation line;
a handle rigidly attached to the pillar at a first point and a second point by a pair of fasteners that extends through the second trim portion of the trim panel, the first point and second point being vertically spaced apart from one another; and
an airbag disposed between the trim panel and the pillar such that in response to deployment of the airbag the first trim portion completely separates from the pillar and the second trim portion along the predetermined separation line, the airbag extending downward along the pillar from an area above the handle to an area adjacent to an upper one of the first point and the second point such that a lower end of the airbag is located above a lower one of the first point and the second point, the first trim portion of the trim panel and the handle are configured such that the first trim portion of the trim panel is restrained to a limited distance of movement away from the pillar by the handle in response to deployment of the airbag.

15. The vehicle body structure according to claim 14, wherein
the second trim portion comprises a pair of separate individual members disposed between the pillar and respective ends of the handle with the fastening elements extending from the ends of the handle through the individual members of the second trim portion.

16. The vehicle body structure according to claim 15, wherein
the first trim portion includes a pair of spaced apart openings with the separate individual members detachably disposed in the openings of the first trim portion.

17. The vehicle body structure according to claim 15, wherein
the pair of separate individual members of the second trim portion and the first trim panel are formed as a single integral unitary element with a line of weakening forming the predetermined separation line.

18. The vehicle body structure according to claim 15, wherein
the trim panel includes a protruding lip formed on one of the first and second trim portions and a recessed portion formed on the other of the first and second trim portions to receive the protruding lip.

* * * * *